(12) United States Patent
Kemeny et al.

(10) Patent No.: US 6,264,716 B1
(45) Date of Patent: Jul. 24, 2001

(54) PROCESS FOR CONTROLLING THE STIRRING ENERGY DELIVERED BY A GAS FLOWING THROUGH A LIQUID

(75) Inventors: Francis L. Kemeny, Lewiston, NY (US); David I. Walker, Mississauga (CA); Jeremy A. T. Jones, Lees Summit, MO (US)

(73) Assignee: Nupro Corporation, Grand Island, NY (US)

( * ) Notice: Subject to any disclaimer, the term of this patent is extended or adjusted under 35 U.S.C. 154(b) by 0 days.

(21) Appl. No.: 09/531,064

(22) Filed: Mar. 18, 2000

Related U.S. Application Data
(60) Provisional application No. 60/125,294, filed on Mar. 19, 1999.

(51) Int. Cl.[7] ..................................................... C21B 11/10
(52) U.S. Cl. .............................. 75/10.13; 75/375; 75/386; 75/387; 75/558; 75/583; 266/47; 266/80; 266/81
(58) Field of Search ................................. 75/10.13, 375, 75/386, 387, 558, 583; 266/47, 80, 81

(56) References Cited

U.S. PATENT DOCUMENTS
4,042,378 * 8/1977 Ramelot .................................. 75/375
4,398,948 * 8/1983 Emoto et al. .......................... 75/375

* cited by examiner

*Primary Examiner*—Melvyn Andrews
(74) *Attorney, Agent, or Firm*—Greenwald & Basch LLP:; Howard J. Greenwald (57) ABSTRACT

A process for stirring molten steel in a container. In this process, argon gas is introduced into the container at a flow rate of from about 0.005 to about 0.2 cubic feet of argon per ton of molten steel per minute, the extent to which said container is caused to vibrate is measured, analog signals are produced corresponding to the rate of flow of argon gas into said container, the analog signals are sampled at a rate of at least 800 times per second, the analog signals are converted to digital signals, the digital signals are transformed by subjecting them to fast Fourier transformation, and the transformed digital signals are evaluated.

19 Claims, 2 Drawing Sheets

PROCESS FOR CONTROLLING THE STIRRING ENERGY DELIVERED BY A GAS FLOWING THROUGH A LIQUID

CROSS-REFERENCE TO RELATED PATENT APPLICATION

This patent application is based in part upon applicants' copending provisional application, U.S. Ser. No. 60/125,294, which was filed on Mar. 19, 1999.

BACKGROUND OF THE INVENTION

Argon stirring of molten steel is well known. See, e.g., U.S. Pat. No. 4,238,227 of Eugene A. Golas et al., the entire disclosure of which is hereby incorporated by reference into this specification. In this argon stirring process, low volumes of inert gas, such as argon, typically at a rate of from about 0.005 to about 0.05 cubic feet per ton of molten steel per minute are continuously introduced into the mass of molten during the rinsing period. Other flow rates are used for the alloying step of steel processing, and for the arc reheating step of steel processing.

The flow rate used during argon stirring of steel is critical. If it is too low, or too high, many problems arise including, e.g., damage to the containment vessel in which the molten steel is disposed, inclusion of impurities (such as carbon, or nitrogen) into the molten steel bath, creation of arc flaring, temperature stratification, and the like.

Even when the flow rate to the steel containment vessel is maintained at some constant level, the flow rate within the vessel may vary. This variance is often caused by factors such as leakage in the gas delivery system, back pressure variations at the plug delivering the gas into the system, plugging and/or erosion of the orifices through which the gas is flowed into the system, and the like.

The prior art has recognized that the flow rate of inert gas within the steel containment vessel is not necessarily the same as the flow rate of gas delivered to the steel containment vessel. This problem was discussed in a paper by R. L. Minion et al. entitled "Improved Ladle Stirring using Vibration Technology at Stelco Hilton Works," which was given at the 1998 Steelmaking Conference Proceedings held in Toronto, Canada in 1998. In this Minion paper, it was disclosed that ". . . there as no direct means of stir indication during reheating at these lower flow rates . . ." and, consequently, ". . . a direct method of stir detection was necessary . . ." The method proposed by the Minion paper involved ladle vibration monitoring in order to measure energy transfer to the ladle.

In the proposed Minion process, an accelerometer was magnetically attached to a ladle to detect ladle vibrations in the vertical direction. Thereafter, the output from the accelerometer was filtered to remove frequencies above 100 Hertz, and the output so filtered was displayed and evaluated to determine the extent of argon mixing taking place within the ladle.

According to the Minion process, the results obtained varied substantially for the same ladle at the same rate of stirring; according to the authors, these incongruous results might be due to ". . . bubble formation frequency at the porous plug . . ." Whatever the causes of these anomalies, the net result is that the Minion process has not met with any commercial success.

It is an object of this invention to provide an improved process for directly detecting the extent of argon gas stirring within a liquid metal container.

It is another object of this invention to monitor the extent of arc flaring which occurs during arc heating of steel and to diminish such arc flaring.

SUMMARY OF THE INVENTION

In accordance with this direction, there is provided a process for controlling the flow of of gaseous argon within mass of molten metal-containing material disposed within a container, comprising the step of flowing inert gas into it and continuously measuring vibration in the radial direction of the container.

BRIEF DESCRIPTION OF THE DRAWINGS

The invention will be described by reference to the enclosed drawings, in which like numerals refer to like elements, and in which.

DESCRIPTION OF THE PREFERRED EMBODIMENTS

This invention relates to molten metal refining in a vessel where a gas is injected for the purpose of stirring a liquid within a vessel. In particular the invention relates to the measurement of stirring energy imparted by the gas, and the use of this measurement in a particular manner and with the use of a particular sensing means to control the flow rate of stirring gas to the desired level.

This invention further relates to steel melting in an electric arc furnace (EAF) and steel refining in a ladle arc refining furnace (LRF). In both these processes, the electric arc can cause damage to the walls of the container of steel. This invention relates to detection of the potential to cause this damage and mitigation thereof The refining of molten metal often relies on stirring to increase the rates of reaction and to assure homogeneous temperature and chemistry. For example, in steel refining, the steel is mixed in the ladle while alloy additions are made to increase the dissolution rate and produce an alloyed steel of uniform composition and temperature. Stirring is also required to cause the steel to contact the slag, thereby cleansing it of inclusive non metallic particles. Sometimes vigorous stirring is required, such as for slag-metal interfacial reactions like that in the removal of sulfur from the steel. Other times, a medium stir is sufficient, for example when arc heating steel in the ladle. A light stir is beneficial for inclusion flotation. The stirring is usually accomplished by injection of an inert gas through a porous refractory element in the bottom of the ladle. Sometimes an electromagnetic stirring method is employed at the same time.

In determining and controlling the beneficial level of stirring with an inert gas, a flow controller is usually used. There are many levels of sophistication, but essentially, the controller measures gas line pressure, back pressure, and flow rate. A valve is opened or closed to increase or decrease flow depending on a flow set point at a given pressure. This system is reliable if there are no pressure fluctuations and if all the gas flows into the liquid steel as intended. However, this is usually not the case.

The porous refractory element may produce highly variable resistance to gas flow, depending on its condition. It may get partially plugged with refractory particles, frozen metal or slag. The pores or channels through which the gas flows may enlarge due to erosion during use and thereby offer less resistance to flow with time. The connections between pipes, hook-ups, and refractory components may develop leaks during use. The gas is under pressure, and it may find another porous path through the ladle refractory, allowing a portion of it to escape without entering the liquid steel. Thus, the system may indicate a level of stirring, as indicated by the volumetric gas flow rate, that is different from the actual degree of stirring in the ladle.

A visual check is typically used to determine that the desired level of stirring is being achieved. The ladle refining station operator varies the stirring level until he observes a level of stir, indicated by the degree of turbulence at the surface of the steel, that he deems to be satisfactory. The indicated flow rates may be quite variable from ladle to ladle for the same apparent level of stir observed. The problem with this type of checking of the flow controller is that the same stirring energy in two ladles of steel may appear quite different when viewing surface conditions. If the slag layer is thick and crusty, for example, a much higher level of stir ring be required to give the same amount of surface turbulence as that seen in a ladle where the slag is thin and fluid. Temperatures, oxygen levels, and steel weight in the ladle also influence the apparent surface turbulence for a given stirring energy.

There are cases where a visual check of argon flow of stirring energy are not possible. For example, a minimal stir may be desired when the ladle of steel is in the casting position. In this case, the ladle is high off the ground, usually with a cover on it, and the steel surface may not be viewed.

In many cases, a higher degree of stirring gas flow is preferable to a lower than required flow. Thus, to be on the safe side, an operator will usually elect to apply more stirring energy than is required for a specific circumstance. The useful life of a stirring element such as a porous plug is dependent on the flow rate and cumulative duration of stirring gas throughput. Thus, in a typical situation, more stirring gas is used than would be optimal, and the cost of stirring element replacement is higher than required. In addition, over stirring of steel in a ladle may result in the production of non-metallic inclusions that may cause quality defects or a reduction in castability.

The present invention obviates the difficulties in application of a specific stirring energy to a container of liquid metal by directly measuring the stirring energy imparted. This is done by measuring the vibration of the container that holds the liquid metal, isolating relevant frequency ranges and integrating to provide a real time based amplitude of this integral, and relating this amplitude to the required stirring energy. In this matter, no more than the sufficient amount of stirring gas is applied to the process, thereby minimizing the cost of stirring gas and stirring element usage, and maximizing product quality and castability.

Steel is recycled by melting in an electric arc furnace. In addition, steel is often heated in the ladle using an electric arc ladle furnace. The gas flow around an electric arc is usually supersonic. The shock wave and momentum associated with the supersonic gas flow is transferred to the surface of the steel and can cause slag to splash. The arc itself can be pushed outward by the shock wave and inductive forces. This effect of energy transfer in a non-axial direction in reference to the electrodes is often referred to as arc flare. The action of the superheated slag and arc flare on the walls of the ladle or furnace can damage refractory components design to protect the ladle or furnace.

It is known that a slag cover of sufficient depth, fluidity, and electrical conductivity will greatly reduce arc flare, as mentioned in the article "Plasma heating for Ladle Treatment Furnaces" by J. F. Oliver et al., in the AIME Electric Furnace Conference Proceedings, Vol. 46, 1988, pp. 313 to 321, but it is difficult to tell by looking at a slag cover if the conditions are conducive to arc flare or not. A measure of the degree of arc flare during arc heating in a furnace or in a ladle could prompt corrective action, thus avoiding the damaging effects of heating with sustained arc flare.

It is known that arc flare is minimized by the presence of a foamy slag. This has been discussed with respect to EAF steel melting in the monograph "Electric Arc Furnace Efficiency" by E. H. Mcintyre and E. R. Landry, CMP Report No. 92-10, December, 1992, Center for Materials Production, Electric Power Research Institute, Pittsburgh, PA. It has also been discussed with reference to ladle arc furnaces in the article "Synthetic Ladle Slag Engineering for Improved Chemistry and Ladle Life" by F. L. Kemeny and D. J. Sosinsky, AIME Electric Furnace Conference Proceedings, Vol. 48, 1990, pp. 67–75.

Slag foaming is practiced in the electric arc melting furnace by injection of carbon or carbon and lime mixtures into an oxidizing environment. The oxidizing environment is created by the presence of FeO in the slag or by the introduction of oxygen into the bath by direct oxygen injection, air injection, or by materials that contain iron oxide such as mill scale. In addition, the combination of oxygen and carbon can be contained in certain raw materials such as direct reduced iron (DRI) or hot briquetted iron (HBI). Further, there is often enough carbon dissolved in the steel itself to generate a foam slag simply by oxygen injection into the bath. No matter what the mechanism, the generation of foamy slag can reduce the extent of damage to the refractory materials used to line the furnace.

The benefits of a foam slag are also useful in the ladle arc refining furnace (LRF). In this case, however, the use of carbon and direct oxygen injection is not appropriate, as it is difficult to control and can thus be detrimental to the process. The carbon may dissolve into the steel, thereby altering chemistry to an unacceptable extent, and the oxygen may remove desirable alloys such a aluminum.

The use of calcium carbide in the form of a blended ladle flux addition can crate a foamy or fluffy slag in the presence of iron oxide in the ladle slag. This method of foaming the slag also helps to protect the ladle refractory materials from the damaging effects of arc flare, but does so in more controlled manner without adverse effects to steel chemistry and the ladle refining process. This process and the fluxes used are described in U.S. Pat. No. 5,279,639.

The benefits of foaming the slag in an electric arc melting furnace (EAF) or in a ladle arc refining furnace (LRF) are well known. However, it is wasteful and not useful to use foaming agents in excess. Moreover, excessive foaming can cause slag to overflow the container, which is particularly detrimental in the LRF. It would therefore be optimal if only the required amount of foamy slag necessary to mitigate the damaging effects of arc flare were generated. Furthermore, the slag foaming duration is variable, and the foam will collapse at various times after foaming agent addition, depending on chemistry, temperature and other physical effects. It is difficult to predict when this collapse will occur, and it is difficult to detect by observation the onset of damaging levels of arc flare. It would be useful to introduce more foaming agent immediately once the onset of arc flare is detected. The detection of arc flare and the timely introduction of the appropriate amount of foaming agents or synthetic slags are the objects of this invention.

In one preferred process of the invention an accelerometer is placed on the side of a container of liquid, either directly mounted, or mounted on a structure which is pressed against the container. The accelerometer is placed so as to measure the acceleration of the container, preferably in the radial direction. The signal from the accelerometer is continuously monitored and interpreted to indicated the amplitude of one or more relevant frequency bands. The amplitude of the conditioned signal is used to determine the degree of stirring energy caused by gas flow into the container. The container may, for example, be a ladle in which the steel is refined and/or heated by an electric arc. The measured degree of stirring energy may optionally be used as an input to a flow controller. In this way, the stirring energy may be controlled around a set point by varying the flow rate of stirring gas as required.

Some process steps may result in vibration of the container in the same frequency range as that caused by gas injection for stirring. The controller is therefore in communication with the data highway or PLCs that can indicate the addition of alloys or the insertion of a temperature measuring or sampling device, or other intermittent activity known to cause vibration in the relevant frequency range. Under these conditions, the flow controller does not respond to the vibration signal, but rather maintains the present setpoints of the flow valves.

An accelerometer is placed on the side of a container of liquid steel, either directly mounted, or mounted on a shaft which is pressed against the container. The accelerometer is placed so as to measure the acceleration of the container, preferably in the radial direction. The signal from the accelerometer is continuously monitored and conditioned to indicate the amplitude of a relevant frequency. The amplitude of the conditioned signal is use to determined the degree of arc flare during arc heating of steel in the container. The container may be an electric arc melting furnace or a ladle in which the steel is heated by an electric arc. The upper set point of the amplitude indicates excessive arc flare. The signal is used by a controller to cause the addition of foaming agents or synthetic slags to the container when the upper set point is exceeded. When the signal is decreased to an acceptable level, defined by a percentage of the upper set point, then the addition of foaming agents or synthetic slags is discontinued. In this manner, the degree of arc flare is controlled to a level that is not severely damaging to the container, and an optimal amount of foaming agent or synthetic slag is added to accomplish this.

The particular details of the process described above will now be described in more detail.

The force of gas bubbles rising through a liquid in a container and breading the surface causes the container to vibrate at one or more characteristic frequencies, depending on the inertial mass, and the physical properties of the liquid and gas. Even with a very large inertial mass, such as a ladle full of steel, this force is sufficient to be clearly detected by a seismic accelerometer that is properly placed. The amplitude of the signal in the characteristic frequency ranges is directly related to the amount of stirring energy received by the liquid in the container. This measure is more indicative of the stirring condition in the container than is the flow rate of stirring gas into the container. The degree of stirring can be thus be monitored, and optionally controlled, on a continuous basis. This invention has been reduced to practice by applying this principle to argon stirring of molten steel in a ladle.

Although it is possible to mount an accelerometer directly onto a ladle, this is often not practical due to the hot and dirty environment. It may be preferred to mount the accelerometer onto a connecting apparatus, such as a moveable shaft or attachment used for the argon delivery system. The accelerometer is mounted onto the connecting apparatus in a location cold enough to prevent damage. The end of the connecting apparatus is forced to make intimate contact with the ladle or furnace by hydraulic, pneumatic or mechanical pressure. In this way energy is transmitted from the ladle to the accelerometer. The accelerometer signal can be immediately amplified to reduce the effect of electrical inductance or other non relevant signals. The amplified signal is processed to isolate the relevant frequency ranges, which usually lie in the 30 to 115 Hertz range. All noises that are not relevant to the stirring process may be filtered out and the amplitude in the relevant frequency ranges may be integrated to yield a net stirring energy strength number. The signal may be further processed and interpreted to yield a signal that is suitable as an input to commonly used programmable logic controllers (PLCs) or other electronic process control equipment. Upper and lower set points for several stirring conditions may be established. For example, the conditions of no stir, low flow "rinse" stir, medium flow "heating" stir, and high flow "alloy" stir may be established for a process in which steel is refined in a ladle arc furnace.

Optionally, other relevant frequency ranges may be isolated to yield information about other aspects of the process. For example, during arc heating of steel in a ladle, the ladle vibrates at. a characteristic 120 Hz frequency caused by the arc strikes onto the surface of the slag and steel in the ladle. This may be used to indicate the degree of impact and potential damage caused by the arcs. Mitigating steps can then be taken if the damage indication is high. These steps might include the addition of ladle flux to the top of the steel to bury the arcs, or the reduction of stir intensity during arc heating, or the reduction of the duration of arc heating.

In some process steps, a vibration is introduced to the container that may be in the frequency range relevant to the stirring energy imparted by gas flow. For example, the insertion of a consumable thermocouple to measure steel temperature causes such a vibration. The thermocouple is housed in a cardboard tube, which releases gas upon introduction to the steel in the ladle, thereby vibrating the ladle as if a strong argon flow were applied for stirring. In such a case, the data highway or PLC for thermocouple insertion sends a signal to the flow controller and the argon flow valve is not adjusted until the event is complete. This does not cause any disadvantage to the process, and will successfully mitigate any flow control valve response to vibrations not caused by the gas flow stirring.

It will be appreciated that each system has its own natural frequency that changes as the system ages. Changes are caused by, for example, wear in the refractory liner of a ladle.

The measurement and control of stirring energy that is imparted by a gas flowing through a liquid metal in a container by: a) monitoring the degree of vibration of the container using an appropriate transducer; b) amplifying and processing the vibration signal to provide an indication of the degree of stirring energy applied to the container; c) converting the processed signal to a signal for an operator interface, PLC, or other suitable controller to open or close a flow valve to cause stirring gas to be delivered to the container to provide the desired stirring energy for the liquid within. The container is a ladle and the metal is liquid steel. The vibration is measured using one or more seismic accelerometers. The Fast Fourier Transform is applied to the signal from the accelerometer to isolate amplitude versus frequency. Those frequency ranges that best show vibration related to gas flow and are not influenced by background noise or nonrelated process noise are isolated and further processed, and all other frequency ranges are masked. The resulting signal is used as input to a flow controller. The flow controller has upper and lower set points for one or more regimes of flow relevant to the process requirements, and flow is controlled to one of these regimes at any time as may be set by the operator. The frequency range that is used to indicate stirring energy is 30 to 115 Hz. The frequency ranges that are used to indicate stirring energy are 30 to 50 Hz and 70 to 90 Hz. The vibration signal is converted to a digital signal. The digital signal is obtained by sampling the vibration signal using data acquisition. The amplitude is integrated with respect to frequency over the desired frequency ranges, and this integral is used as the time based output that indicates stirring energy in the container. The transducer is a seismic accelerometer. The accelerometer is magnetically attached to the container. The accelerometer is mounted to a coupling device that delivers the stirring gas to the container.

The monitoring of the arc flare during arc heating of steel in a container by: a) monitoring the degree of vibration of the container using an appropriate transducer; b) amplifying and processing the vibration signal to provide an indication of the degree of arc flare or arc impact energy on the surface of steel; c) converting the processed signal to a suitable signal for an operator interface, PLC, or other suitable controller to warn the operator of excessive arc flare, or to cause action to be taken to obviate the arc flare and the resulting damage. Thee container is a ladle. The transducer is one or more seismic accelerometers. The transducer is a microphone. The transducer is a Doppler laser aimed at a reflective target in communication with the container. The vibration is sampled by data acquisition, separated into frequency ranges using Fast Fourier Transforms, and the amplitude of vibration in the frequency range around 120 Hz, plus or minus about 2 Hz, is isolated and integrated with respect to time. The excessive level of indicated arc flare causes a PLC or other controller to make an addition of reagents to the vessel designed to reduce arc flare. The reagent is a carbon containing material and the vessel is an electric arc melting furnace. The reagent is a slag forming mixture and the vessel is a ladle. The slag forming mixture contains calcium carbide.

The force of the electric arcs hitting the surface of the steel charge every half cycle has a characteristic frequency, depending on the number of electrodes and phases in the circuit. The majority of arc furnaces and ladle arc furnaces operate with three graphite electrodes using 3-phase power. In these cases, the surface of the steel charge is struck by an arc in a repetitive, periodic fashion, giving a characteristic vibration frequency. Despite the large inertial mass of a ladle full of steel or a furnace full of steel, this force is sufficient to be clearly detected by a seismic accelerometer that is properly placed. The amplitude of the signal in the characteristic frequency range is directly related to the amount of arc impact energy received by the ladle or furnace, and is thus a measure of arc flare. The degree of arc flare can be thus be monitored on a continuous basis.

Although it is possible to mount an accelerometer directly onto a ladle or furnace, this is often not practical due to the hot and dirty environment. It is often preferred to mount the accelerometer onto a connecting apparatus, such as a shaft or plunger. The accelerometer is mounted on the remote end of the connecting apparatus. The other end of the connecting apparatus is forced to make intimate contact with the ladle or furnace by hydraulic, pneumatic, or mechanical pressure. In this way energy is transmitted from the ladle or furnace to the accelerometer. The accelerometer signal is immediately amplified to reduce the effect of electrical inductance or other non relevant signals. The amplified signal is processed to isolate the relevant frequency range, in most cases about 110 to 130 Hz in a 3-phase arc furnace. The signal is further processed to yield an EMF signal that is suitable as an input to commonly used programmable logic controllers (PLCs) or other electronic process control equipment. Two set points for the processed signal are established: an upper set point indicating an excessive level of arc flare that dictates the addition of foaming agent or synthetic slag to the furnace or ladle, and a lower set point indicating the redundancy of further addition. The addition of foaming agents or synthetic slags is controlled to maintain the signal between the two set points.

Figure 1:
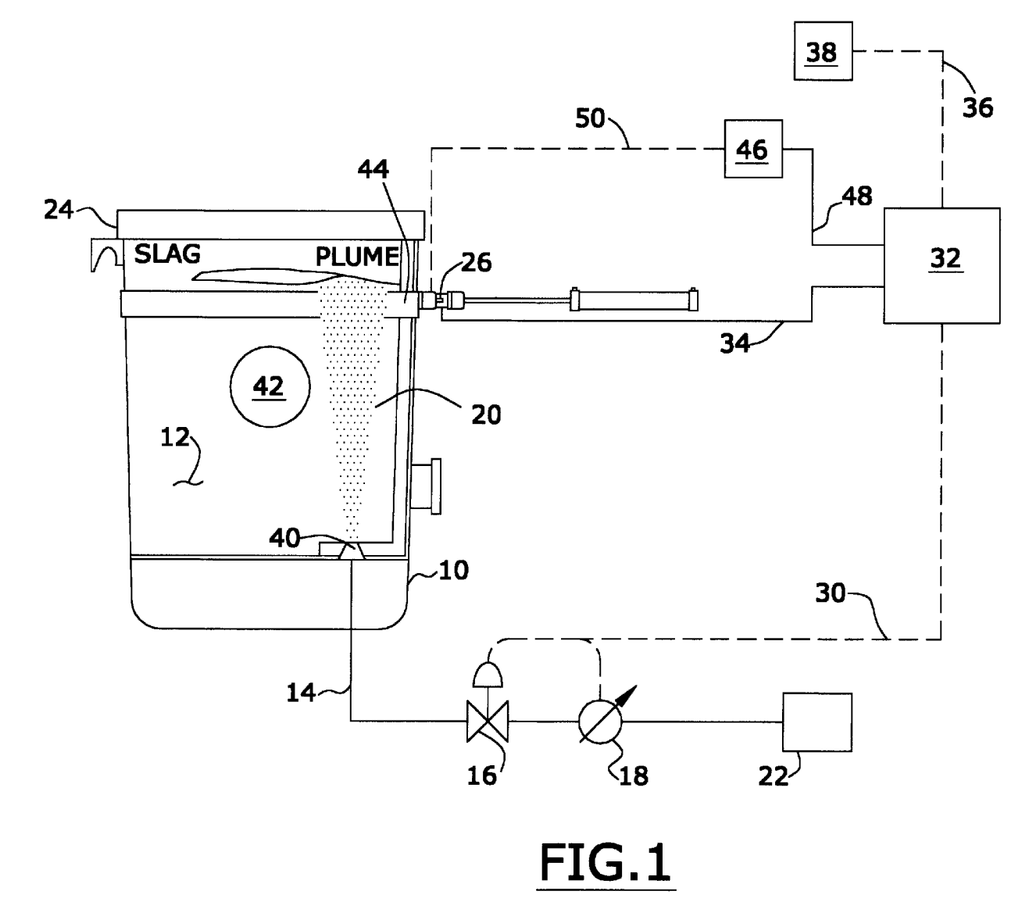
FIG. 1 is a schematic representation of an accelerometer attached to a steel ladle.

A Preferred Process of the Invention FIG. 1 is a schematic representation of a steel ladle 10 in which is disposed molten steel 12 and into which is bubbled a gas 20. The gas 20 is preferably an insert gas. One can use gases such as argon, nitrogen, carbon dioxide, and the like. In one preferred embodiment, argon is used, and reference will be made to argon in the remainder of this specification.

The argon gas 20 is preferably introduced through argon line 14, and its flow is controlled by means valve 16 and flow meter 18. Conventional argon supply means, such as argon supply means 22, may be used.

As will be apparent to those skilled in the art, the combination of valve 16 and flow meter 18 comprises a flow controller. Other flow controller systems may be used. In any event, the flow controller system is operatively connected via line 30 to controller 32. The controller 32 is also connected via line 34 to accelerometer 26. As will be apparent, as controller 32 processes information from a accelerometer 26, and also data supplied via line 36 from source 38, it causes the flow rate of argon gas to vary. The source 38 may be, e.g., a programmable logic controller, a distributed control system, an ethernet connection to the data highway, etc. The source 38 provides information to controller 32 regarding events which could influence the vibration measurement made by accelerometer 26. Thereafter, controller 32 evaluates this information in order to eliminate extraneous sources of vibration from its processing.

Referring again to FIG. 1, during the stirring portions of the steel making process, the flow rate of argon gas through line 14 generally is regulated so that it is delivered at a rate of from about 0.005 to about 0.2 cubic feet of argon per ton of molten steel 12 in ladle 10 per minute.

As will be described in greater detail later in this specification, accelerometer 26 measures the vibration produced in ladle 10 because of the introduction of argon gas 20. Thereafter, controller 32 can correlate this degree of vibration with other information to determine the actual flow rate of the argon 20 within ladle 10. The flow rate of the argon gas 20 within the ladle 10 may not be identical to the flow rate of the argon gas 20 through line 14; typically it is not. Often leakage of the argon gas occurs at many possible points between source 22 and injection point 40, which may be, e.g., porous plug 40. Thus, the argon gas 20 can leak as it flows to and through porous plug 40, and/or at other connections points between source 22 and porous plug 40. The leakage of argon gas 20 can be from about 0 to about 100 volume percent. Typically, from about 10 to about 20 volume percent of such argon gas leaks.

By making measurements of the system depicted in FIG. 1 over a period of time, and by monitoring the system, one can determine the extent of leakage by the extent of vibration measured. The flow rate of argon gas 20 within ladle 10 is proportional to the vibration measured. Thus, by utilizing the system depicted in FIG. 1, one can not only adjust the flow rate of the argon gas in the line 14 to optimal values, but one also is alerted to the extent of leakage in the system.

The preferred embodiment depicted in FIG. 1 is especially useful in a steelmaking operation in which the temperature of the molten steel in ladle 10 generally is from about 2,500 to about 3,100 degrees Fahrenheit. However, the system can also be used with other liquid such as, e.g., molten copper, molten aluminum, etc.; any liquid which requires stirring by means of injected gas can profitably use the process of this invention.

Referring again to FIG. 1, and in one optional embodiment, a stirrer 42 is used in conjunction with the stirring afforded by the argon 20. Thus, by way of illustration and not limitation, when the material being stirred is liquid steel, stirrer 42 may be an electromagnetic stirrer. Thus, by way of further illustration, when the material being stirred is liquid aluminum, the stirrer 42 may be a mechanical stirrer.

Referring again to FIG. 1, and in the preferred embodiment depicted therein, it is seen that an accelerometer 26 is used to measure the vibrations at contact point 44 of ladle 10. The accelerometer is preferred comprised of at least one crystal which, when it is contacted by one or more vibrations, is deformed and thus, by the well-known piezoelectric effect, produces voltage proportional to the rate and extent of deformation. These accelerometers preferably contain an integrated circuit and are well known in the art as either "ICP" or "integrated circuit piezoelectric" accelerometers. They are commercially available; thus, e.g., one such suitable accelerometer is the PCB Piezoelectric accelerometer available from the PCB Piezoelectric Company of Buffalo, New York. These accelerometers are also well known in the patent literature; see, e.g., U.S. Pat. Nos. 5,377,273 and 5,919,144, the entire disclosures of which are hereby incorporated by reference into this specification.

Figure 2:
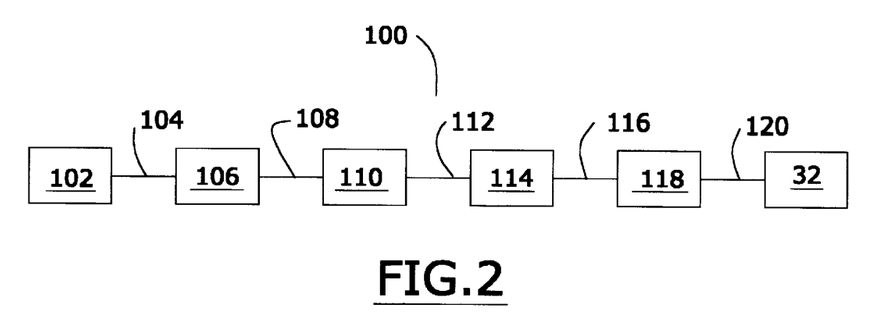
FIG. 2 is a schematic representation of a preferred integrated circuit piezoeletric accelerometer which is preferably used in the process depicted in FIG. 1.

FIG. 2 is a schematic representation of one preferred integrated circuit accelerometer system 100. Referring to FIG. 2, it will be seen that accelerometer system 100 is comprised of an acclerometer 102. The accelerometer 102 is preferably an ICP accelerometer such as, e.g., model IMI 626A03 sold by the PCB Piezoelectric Company of Buffalo, N.Y. The accelerometer 102 preferably contains an integrated circuit which is connected via line 104 to a constant current source 106. This type of power supply is readily available; thus, e.g., one may use a model 482A16 four-channel line powered adjustable gain signal conditioner sold, e.g., by the PCB Piezoelectric Company.

The constant current source 106 provides linear amplification of the signal from accelerometer 102. It is preferred that the constant current source 106 provide a high signal to noise ratio by means of appropriate conditioning.

The conditioned signal from current source 106 is then passed via line 108 to an antialiasing filter 110, which filters out signals with specified frequencies. In one embodiment, a low pass filter is used to remove all signals above 400 Hz. Low pass filters with other characteristics also may be used. One may use any of the well-known anti-aliasing filtering technologies such as, e.g., those disclosed in U.S. Pat. Nos. 6,008,687, 5,917,872, 5,902,341, 5,777,512, 5,732,107, and the like. The disclosure of each of these United States patents is hereby incorporated by reference into this specification. One suitable such filter is made by the Frequency Devices Company of Haverhill, Mass. and sold as model number D70L8L.

The filtered signal from signal 110 is then passed via line 112 to signal conditioning module 114 which translates the analog signal passed via line 112 into a form suitable so that such signal can be translated into a digital signal in translator 118. Typically, in such signal conditioning modules 114, the signals are converted so that they fall within a specified range of voltages and/or currents. One suitable signal conditioning module 114 can be purchased as model number 5B41 from the Analog Devices Company. This device is also sold by the National Instruments Company of Austin, Tex.

The conditioned signal from signal conditioning module 114 is then passed via line 116 to data acquisition card 118, in which the signal is then converted into a digital form by sampling the conditioned analog signal. These type of data acquisition cards are well known to those skilled in the art; see, e.g. U.S. Pat. Nos. 4,670,271 and 4,591,292, each of which refers to a data acquisition card available from National Semiconductor Corporation of Stanta Clara, Calif. as model number ADS1216HC. Applicant prefers to use a data acquisition card identified as model PCI1200, which is manufactured by the National Instruments Company of Austin, Tex.

The digital signals from data acquisition card 118 are then passed via line 120 to controller 32.

Referring again to FIG. 1, and in the preferred embodiment depicted therein, it will be seen that, instead of using the accelerometer 26 (and/or the accelerometer system 100), or in addition thereto, one may use a laser vibrometer 46 operatively connected to controller 32 via line 48. This vibrometer 46 measures the vibration at contact point 44 by means of laser rays 50. One may use any of the commercially available laser vibrometers as vibrometer 46 including, e.g., the laser vibrometers disclosed in U.S. Pat. No. 6,009,111, 6,008,496, 6,007,494, 5,974,881, 5,969,621, and the like. The disclosure of each of these United States patents is hereby incorporated by reference into this specification. One suitable laser vibrometer, e.g., Is manufactured by Nicolet Instrument Technologies Company of Madison, Wis. as model number Orion 986A0087.

Figure 3:
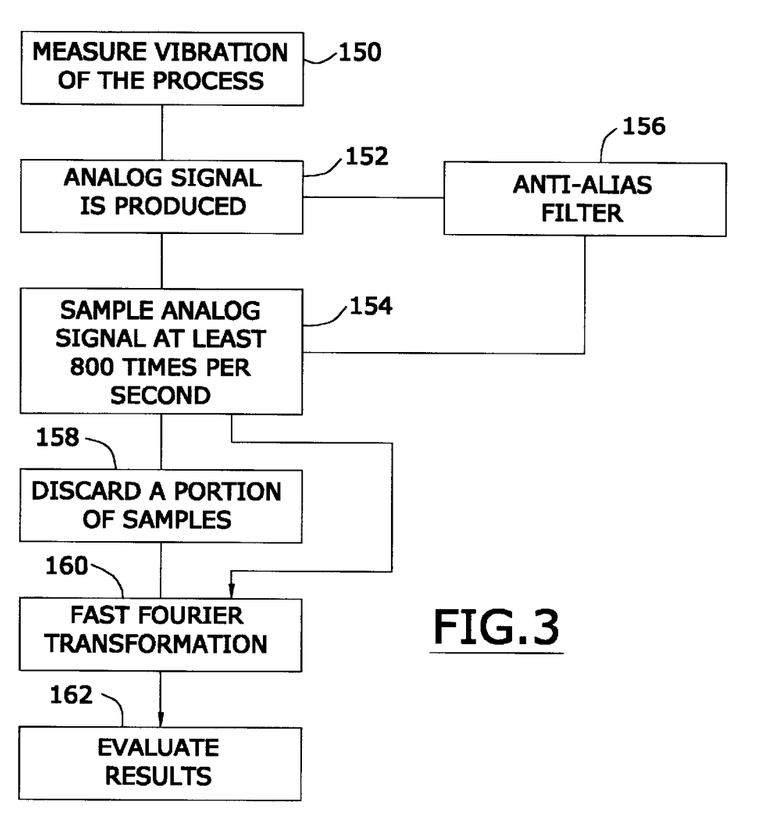
FIG. 3 is a flow chart illustrating one preferred measurement process of the invention.

FIG. 3 is is a flow chart of a preferred process of the invention. In step 150 of the process, the vibrations produced in ladle 10 during the steel refining process are measured, preferably by means of the ICP acceleromter. Alternatively, or additonally, one may use a laser vibrometer for such measurment.

In step 152 of the process, an analog signal proportional in amplitude to the vibration being measured is produced. The signal so produced by be passed to an anti-aliasing filter in step 156, which will remove all signals greater than 400 Hz in frequency; and the signals thus fitlered may then be passed to step 154, in which they are sampled. Alternatively, or additionally, the signals from step 152 may be directly passed to sampling step 154; in this latter case, a portion of the signals sampled in step 154 are discarded in step 158.

In step 154 of the process, the analog signal produced in step 152 and/or step 156 is sampled by the data acquisition card 118 (see FIG. 2) at a rate of at least about 800 times per second. Applicant has discovered that, unless the sampling rate of the analog signal is at least about 800 times per second, the data produced by the claimed process is not sufficiently accurate.

In one embodiment, the analog signal produced in step 152 is sampled at a rate of at least about 1,024 times per second. In another embodiment, the sampling rate is 2,048 times per second. As will be apparent to those skilled in the art, this sampling process converts the signals from analog signals to digital signals by means such as, e.g., the means described elsewhere in this specification (see FIG. 2).

In step 154 of the process, with respect to those signals, if any, which were not subject to filtering in step 158, a portion of the samples from step 152 are discarded. Although this step is optional, it is preferred not to have to evaluate all of the samples produced in step 152. In general, at least about one-half of the samples produced in step 154 are discarded if they have not previously been subjected to filtering in step 156.

In step 160, the samples are preferably subjected to a fast Fourier transformation which distributes the sampled signals into frequency bands. Fast Fourier transformation circuits are well known to those skilled in the art and are described, e.g., in U.S. Pat. Nos. 6,009,111, 6,008,496, 6,007,494, 5,974,881, 5,969,621, and the like. The disclosure of each of these United States patents is hereby incorporated by reference into this specification.

In step 162, the signals produced in step 160 are evaluated. The signals can be evaluated to determine the amount of arc flare present in the ladle 10. Alternatively, or additionally, the signals can be evaluated to determine the amount stirring energy being imparted by the flowing argon gas 20 in the ladle 10.

To determine the extent of arc flare present in ladle 10, one can study the signals produced in step 160 and study the amplitude of the signals produced in the frequency range of from about 116 to about 124 Hertz. Applicant believes that signals produced in this frequency range indicate the extent of arc flare. In general, the greater the amplitude of such signals, the greater the extent of such arc flare, especially when the effect of "noise signals" is ignored.

If the extent of arc flare indicated by the examination of the signals from step 160 is greater than a specified limit, then an operator can be alerted about this unacceptable conditional; conventional signaling means (such as blinking red light or a horn) may be used. Alternatively, mitigating means may be used to decrease the arc flare such as, e.g., the addition of slag-forming materials, the reduction of argon flow, and/or the addition of a slag-foaming material.

Some degree of arc flare is always preferably present. If the degree of arc flare indicated by the signals from step 160 is lower than a specified amount, this generally indicates that the slag is foaming excessively within the ladle 10; and, in this case, suitable anti-foaming materials may be added.

One may also use the signals from step 160 to monitor the extent of argon gas flow within ladle 10. For any particular process, the ideal argon gas flow rates for the steps of rinse stirring, arc reheating, and alloying (desulfurizing) are determined by trial and error; a series of controlled variable experiments are conducted in order to calibrate the system and to determine the optimal argon gas flow rates for each of these steps.

Once the optimum argon gas flow rates for each of these steps has been established, one then can establish the extent to which any one of the optimum flow rates causes vibration within the ladle 10. In general, there will be a range of acceptable values of vibration; and upper and lower set points for these ranges will be established.

Thereafter, the accelerometer 100 monitoring system (or a comparable laser vibrometer system) can determine whether any particular system is operating within the desired ranges. If it is not, then controller 32 will adjust the flow rate of the argon gas 20 and/or alert an operator.

In determining the optimum ranges of argon gas flow, and in measuring the vibration caused by such gas flow, the process of the instant invention takes into consideration vibration noise. As is known to those skilled in the art, vibration noise is caused by vibrations in any particular system which are not due to the flow of argon gas within the ladle 10. Such vibration noise can come from many different sources including, e.g., building background noise (generally with a frequency of less than 20 Hz), processing steps such as temperature sampling, etc.

For any particular system, the vibrations from all sources other than argon gas flow are measured. These measurements will indicate that certain signals, with certain frequency ranges and/or amplitude ranges, are generally produced from certain non-argon-gas-flow sources. The controller 32, when it discovers a signal produced from a non-argon-gas-flow source, will ignore the signal. This is a form of "digital filtering," in which certain data recognized by the controller 32 as not being recognized is not allowed to pollute the relevant data.

The following examples are presented to illustrate the claimed invention but are not be deemed limitative thereof. Unless otherwise specified, all parts are by weight and temperatures are in degrees Fahrenheit.

EXAMPLE 1

An accelerometer was mounted to the back of a grounding rod on a ladle furnace. The ladle full of steel, sitting on a ladle transfer car, was brought into position underneath the ladle furnace. In a radial direction pointing to the centerline, the grounding rod was forced against the outside of the ladle shell by a hydraulic cylinder. The ladle contained 250 tons of steel, which was heated by a 3-phase 3-electrode arc system. The accelerometer signal was amplified at the source in order to minimize the interference by electrical inductance. The signal was routed to a computer using industrial twisted pair cable. A data acquisition circuit board sampled the analog signal at high frequency, yielding a large digital sample size. The computer software divided the digital signal into frequency ranges using Fast Fourier Transform (FFT) analysis. The resulting frequency spectrum was studied in real time for conditions of no stirring, light stirring, moderate stirring, and heavy stirring, both during and without arc reheating. It was observed that the amplitude of the frequencies between 70 and 90 Hz reacted proportionally to the stirring level in the ladle. All other frequency ranges were relatively unaffected, and more importantly, other activities such as crane movement and arcing did not show up in the frequency range of 70 to 90 Hz. Thus, an integral of the signal strength was observed stirring level in the ladle for several heats of steel. The settings for rinse, heating, and alloying stir were easily identified by the signal, and confirmed by the operator through visual observation of surface turbulence. The integrated signal strength setpoints were then routed to the PLC that controls the flow rate of argon to the ladle. The flow control valve was caused to respond to this signal based on an operator input for the desired stirring rate. The correct amount of stirring was achieved for each operator input regardless of stirring plug condition, argon supply line leakage, or arc heating operation. During alloy addition, temperature measurement and sample tube insertion, the argon flow control valve was instructed not to respond to changes in vibration signal. This was possible since the flow controller was linked to the data highway where the event information was readily available. The amount of stirring for each heat of steel and the stirring rate was archived and stored for analysis of stirring as it relates to argon consumption, porous plug life, and steel quality.

Additionally, the amplitude of the 120 Hz frequency signal was continuously monitored. An amplitude in excess of a predetermined limit was defined as indicative of arc flare. If the amplitude of the 120 Hz signal persisted over the arc flare limit, and alarm warned the operator and advised an addition of slag forming material to bury the arcs and reduce arc flare damage.

EXAMPLE 2

A ladle of steel was delivered to the continuous caster, where it is was desired to bubble argon at a minimal rate through the porous plug. An accelerometer was mounted to the skirt of the ladle using a magnetic mount. Attached to the accelerometer was a signal amplifier. The signal was routed to an analog signal processing unit using twisted pair cable. The signal was divided into frequency ranges using Fast Fourier Transform (FFT) modification. The frequency windows suitable for isolating the stirring signal and eliminating background vibrations were determined to be 30 to 50 Hz and 70 to 90 Hz. The signals outside these two windows were masked. The amplitude of the signal was integrated with respect to frequency in the relevant frequency ranges. The integrals were combined and displayed as an analogue signal on an operator panel. The signal was calibrated to indicate "no flow" when the argon was turned off. As the operator increased argon flow to the stirring plug, the analogue display roses to indicate increasing stir. The operator then manually controlled the flow in response to the display to achieve the desired minimal stirring condition.

EXAMPLE 3

An accelerometer was mounted to the back of a grounding rod on a ladle furnace. The ladle full of steel, sitting on a ladle transfer car, was brought into position underneath the ladle furnace. In a radial direction pointing to the centerline, the grounding rod was forced against the outside of the ladle shell by a hydraulic cylinder. The ladle contained 250 tons of steel, which was heated by a 3-phase 3-electrode arc system. The accelerometer signal was amplified at the source in order to minimize the interference by electrical inductance. The signal was routed to a dynamic signal analyzer using shielded twisted pair cable. The signal analyzer divided the signal into frequency ranges using Fast Fourier Transform (FFT) analysis. Prior to arcing, there was no discernable signal in the range 110 to 130 Hz. Upon striking the arc and commencement of steel heating, there was a clearly discemable peak centered around 120 Hz. The amplitude of this peak was quite high, indicating a level of arc flare. This particular charge of steel had very little slag cover. About 2,000 lbs of a synthetic slag forming mixture was added to the surface of the steel. This increased the slag cover thickness, and thereby decreased the amount of arc flare. Upon addition of the synthetic slag, the 120 Hz signal diminished significantly in amplitude, confirming that arc flare had been decreased.

EXAMPLE 4

An accelerometer was mounted to the shell of an electric arc furnace. The furnace contained a charge of 5 tons of steel, which was melted by a 3-phase 3-electrode A.C. arc system. The accelerometer signal was amplified at the source in order to minimize the interference by electrical inductance. The signal was routed to a dynamic signal analyzer using shielded twisted pair cable. the signal analyzer divided the signal into frequency ranges using Fast Fourier Transform (FFT) analysis. During steel refining and arc heating, there was a clearly discernable peak centered around 120 Hz. The amplitude of this peak was quite high, indicating an excessive level of arc flare. About 50 lbs. of a slag foaming mixture containing calcium carbide was added to the surface of the steel. A foam was generated by the carbon monoxide production, which increased the slag cover thickness and thereby decreased the amount of arc flare. Upon addition of the slag foaming mixture, the 120 Hz signal diminished significantly in amplitude, confirming that arc flare had been decreased.

It will be apparent to those skilled in the art that the process described in this spefication may be used to detect the presence of conditions other than arc flare and/or excessive or inadequate amounts of argon gas flow within the ladle 10. Thus, by way of illustration and not limitation, one may detect the intensity of stirring caused by electromagnetic induction means (see, e.g., element 42 of FIG. 1), the degree of agitation caused by the addition of reactive elements (such as calcium metal into the steel, or the addition of magnesium metal to molten iron for the purpose of desulfurization), the degree of stirring caused by vacuum degassing, etc.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

What is claimed is:

1. A process for stirring molten steel disposed within a container, comprising the steps of introducing argon gas into said container at a flow rate of from about 0.005 to about 0.2 cubic feet of argon per ton of said molten steel in said container per minute, measuring the extent to which said container is caused to vibrate because of the flow of said argon gas into said container, producing a multiplicity of analog signals corresponding to the rate of flow of said argon gas into said container, sampling said multiplicity of analog signals at a rate of at least 800 times per second, converting said analog signals to digital signals, transforming said digital signals by subjecting them to fast Fourier transformation, and evaluating said transformed digital signals, wherein the extent to which said container is caused to vibrate because of the flow of argon gas into said container is measured by a measuring means selected from the group consisting of a laser vibrometer and an integrated circuit piezoelectric accelerometer.

2. The process as recited in claim 1, wherein said measuring means is an integrated circuit piezoelectric accelerometer.

3. The process as recited in claim 2, wherein said argon gas is flowed through a flow controller prior to being introduced into said container.

4. The process of claim 3, wherein said flow controller is comprised of a flow meter.

5. The process of claim 4, wherein said flow controller is comprised of a flow control valve.

6. The process as recited in claim 1, comprising the step of controlling said flow of argon gas into said container by means of a controller.

7. The process as recited in claim 6, wherein said controller is a programmable logic controller.

8. The process as recited in claim 2, wherein said argon is introduced into said container through a porous plug.

9. The process as recited in claim 2, further comprising the step of stirring said molten steel by means of a liquid steel stirrer.

10. The process as recited in claim 9, wherein said liquid steel stirrer is an electromagnetic stirrer.

11. The process as recited in claim 2, further comprising the step of amplifying said analog signals.

12. The process as recited in claim 2, further comprising the step of filtering said analog signals to remove those signals with a frequency greater than a specified value.

13. The process as recited in claim 12, wherein all signals with a frequency greater than 400 Hertz are removed.

14. The process as recited in claim 2, comprising the step converting said analog signals to digital signals in a data acquisition card.

15. The process as recited in claim 14, wherein a first portion of said digital signals are discarded, and a second portion of said digital signals are transformed by subjecting them to fast Fourier analysis.

16. The process as recited in claim 1, wherein said measuring means is a laser vibrometer.

17. The process as recited in claim 2, wherein said analog signals are sampled at a rate of at least about 1,024 times per second.

18. The process as recited in claim 2, wherein said analog signals are sampled at a rate of at least about 2,048 times per second.

19. The process as recited in claim 2, wherein said transformed digital signals are evaluated by determining the amplitude of such signals with a frequency of from about 116 to about 124 Hertz.

* * * * *